United States Patent
Lu et al.

(10) Patent No.: US 7,567,442 B2
(45) Date of Patent: Jul. 28, 2009

(54) CPU MOUNTING APPARATUS

(75) Inventors: Li-Chin Lu, Taipei Hsien (TW); Jian-Hua Xiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 96 days.

(21) Appl. No.: 11/873,418

(22) Filed: Oct. 17, 2007

(65) Prior Publication Data

US 2008/0158807 A1 Jul. 3, 2008

(30) Foreign Application Priority Data

Oct. 18, 2006 (CN) .................... 2006 2 0015274 U

(51) Int. Cl.
*H01R 12/16* (2006.01)
(52) U.S. Cl. .................... 361/785; 361/801; 361/802
(58) Field of Classification Search .............. 361/785, 361/600, 760, 720, 736, 748, 807, 810, 801, 361/802, 686, 687, 700–703; 29/256, 258, 29/741, 764, 758; 439/152, 155, 135, 526, 439/940
See application file for complete search history.

(56) References Cited

U.S. PATENT DOCUMENTS

| | | | | |
|---|---|---|---|---|
| 4,521,959 A | * | 6/1985 | Sprenkle | 29/741 |
| 5,193,269 A | * | 3/1993 | Dattilo | 29/764 |
| 5,842,261 A | * | 12/1998 | Ortiz | 29/426.5 |
| 6,880,091 B1 | * | 4/2005 | Mattis et al. | 726/5 |
| 7,050,302 B2 | * | 5/2006 | Llapitan et al. | 361/704 |
| 7,086,144 B2 | * | 8/2006 | Luo et al. | 29/741 |
| 7,311,534 B2 | * | 12/2007 | Luo | 439/135 |

* cited by examiner

*Primary Examiner*—Hung S Bui
(74) *Attorney, Agent, or Firm*—Frank R. Niranjan

(57) ABSTRACT

A CPU mounting apparatus is disclosed. The CPU mounting apparatus includes a CPU receiver, two lever holders, two clips, two resilient members, a pair of levers, and a handle. The CPU receiver defines a cavity for receiving a CPU. The two clips are slidably mounted between the lever holders and the CPU receiver and include clip ends for holding the CPU. The resilient members apply resilient forces on the clips so that the clips can hold the CPU firmly. The levers are fixed on the lever holders and are positioned between the clips for pushing the clips to move. The handle is mounted on the lever holders above the levers for driving the levers to move. The CPU mounting apparatus is used to load/remove a CPU to/from a socket.

7 Claims, 10 Drawing Sheets

CPU MOUNTING APPARATUS

BACKGROUND

1. Technical Field

The present invention relates to a CPU mounting apparatus.

2. General Background

Generally, a central processing unit (CPU) is inserted directly into a CPU socket. Referring to FIGS. 9 and 10, a socket 12' of a CPU 13' is mounted on a motherboard 1'. The socket 12' includes a plurality of pins (not shown). The CPU 13' has a plurality of pin holders (not shown) for engaging with the pins of the socket 12'. During installation, the CPU 13' is inserted into the socket 12' vertically. However, some of the pins are often damaged or bent when too much force is applied on the pins or when the force applied is not evenly spread out. The damaged or bent pins will not connect with the pin holders whereby a loose electrical connection is arisen. Moreover, it is rather inconvenient and laborious to insert the CPU into the socket by hand.

Therefore, what is needed is an apparatus which readily and securely attaches or removes a CPU to or from a socket.

SUMMARY

A CPU mounting apparatus is disclosed. The CPU mounting apparatus includes a CPU receiver, two lever holders, two clips, two resilient members, a pair of levers, and a handle. The CPU receiver defines a clip receiving groove in a top surface, and a cavity for receiving a CPU in a bottom. The two lever holders are mounted on the CPU receiver above the clip receiving grooves and are facing each other. The two clips are slidably received in the clip receiving groove. Each clip includes a clip end for holding the CPU. The resilient members connect the lever holders and the clips respectively. The levers are fixed on the lever holders and are positioned between the clips for pushing the clips to move. The handle is mounted on the lever holders above the levers for driving the levers to move.

Further features and advantages will be provided or will become apparent in the course of the following detailed description.

DETAILED DESCRIPTION OF THE EMBODIMENT

Figure 1:
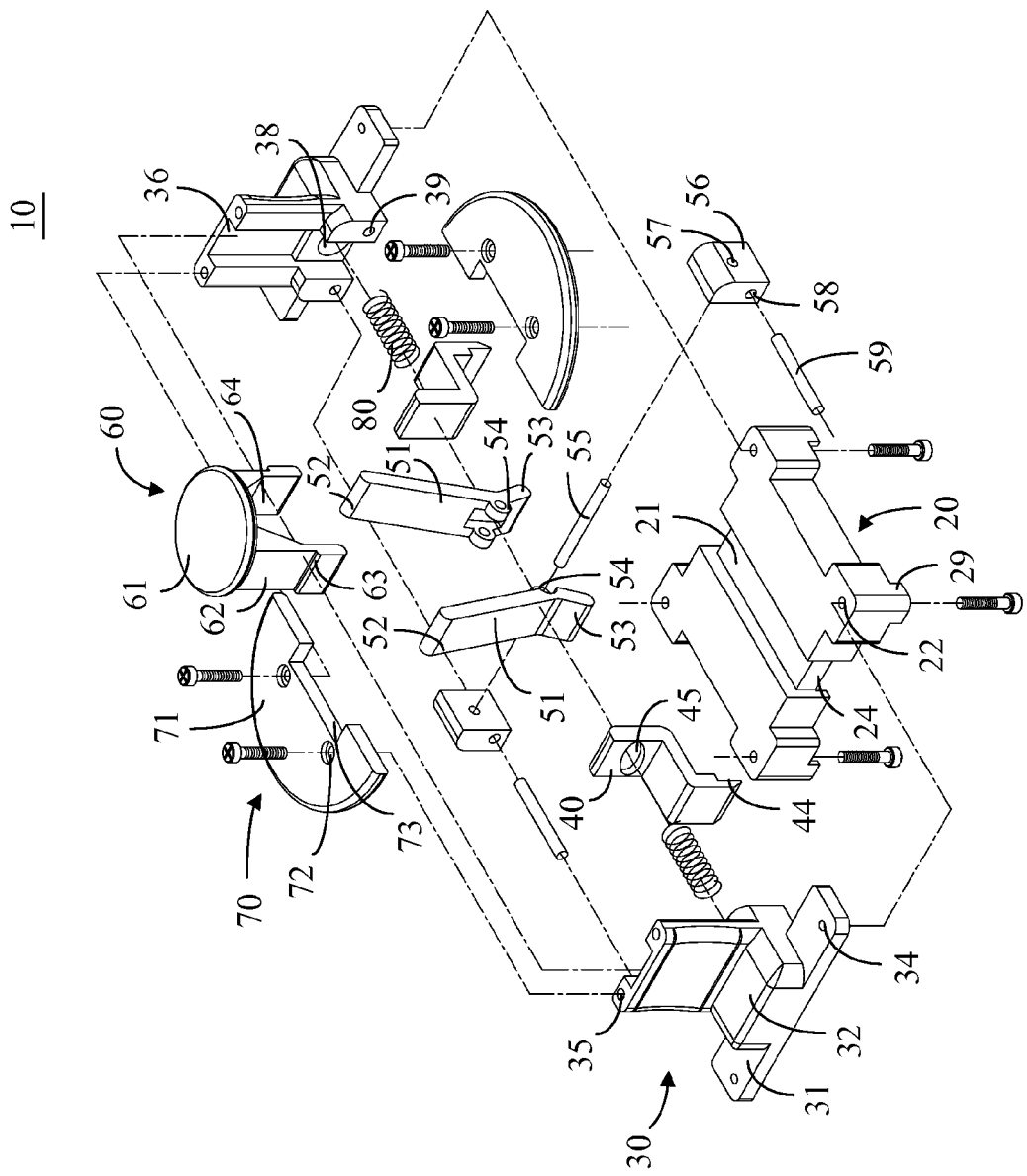
FIG. 1 is an exploded, isometric view of a mounting apparatus in accordance with a preferred embodiment of the present invention.
Figure 2:
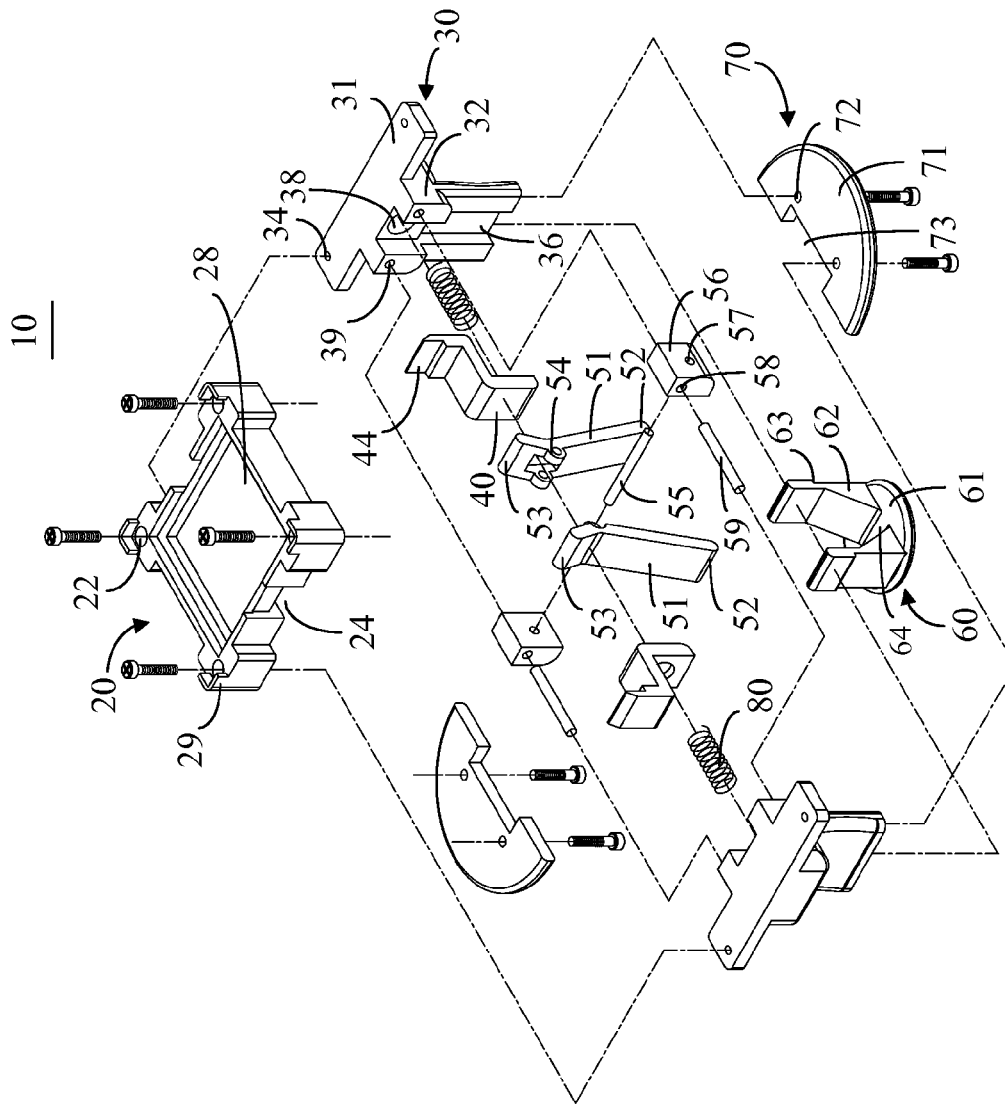
FIG. 2 is similar to FIG. 1, but viewed from another aspect.

Referring to FIGS. 1 and 2, a CPU mounting apparatus in accordance with a preferred embodiment of the present invention is shown. The CPU mounting apparatus 10 includes a CPU receiver 20, a pair of levers 51, a pair of lever holders 30, a pair of clips 40, a handle 60, a handle holder 70, and a pair of resilient members 80.

The CPU receiver 20 is substantially a square box. The CPU receiver 20 defines a cavity 28 in a bottom. The cavity 28 is configured for receiving an upper portion of a CPU. The cavity 28 has a step corresponding to a stepped top of the CPU to accommodate the CPU tightly.

The CPU receiver 20 defines a clip guide groove 21 in a top surface and two cutouts 24 in opposite side surfaces of the CPU receiver 20 as shown in FIG. 1. Each cutout 24 communicates with an end of the clip guide groove 21 and the cavity 28. Four projecting portions 29 extend downwardly from four corners of the CPU receiver 20. Each projecting portion 29 is L-shaped. Four through holes 22 are defined in the four corners of the CPU receiver 20.

Each lever 51 includes a first arm 52, a second arm 53, and a fulcrum 54 between the first arm 52 and the second arm 53. Each fulcrum 54 defines at least one pivot holes.

Each clip 40 is Z-shaped. A blind resilient receiving hole 45 is defined in a top of the side surface of each the clip 40. A thin clip end 44 extends from a bottom of each the clip 40.

The two lever holders 30 are symmetrical to each other. Each lever holder 30 includes a lever receiving portion 32 and two mounting portions 31 extending horizontally at opposite sides of the lever receiving portion 32. An inner surface of the lever receiving portion 32 defines a sliding groove 36 extending vertically and a blind resilient receiving hole 38 at a bottom end of the sliding groove 36. A bottom of the inner surface defines a pair of holes 39 at opposite sides of the resilient receiving hole 38. A top surface of the lever receiving portion 32 also defines a pair of fastener holes 35 at opposite sides of the sliding groove 36. Each mounting portion 31 defines a fastener hole 34.

The handle 60 includes a round cap 61 and a pair of sliders 62 extending downwards from the round cap 61. Inner surfaces of the sliders 62 cooperatively define a lever actuating area 64. A distance between the inner surfaces is increased gradually from top ends to middle portions of the sliders 62, and is unchanged from the middle portions to bottom ends of the sliders 62. Outer surfaces of the sliders 62 are substantially flat surfaces perpendicular to the round cap 61. A step 63 is formed on the outer surfaces of the sliders 62, thus a distance between the outer surfaces at upper portions of the sliders 62 is shorter than that at lower portions of the sliders 62.

The handle holder 70 comprise of two half circles 71. Each half circle 71 defines a rectangular cutout 73 at a center of a flat side. A length of the long side of the cutout 73 is equal or a bit longer than the distance between the outer surfaces at the upper portions of the sliders 62, thus, the cutout 73 can receive the upper portions of the sliders 62. The length of the long side of the cutout 73 is smaller than the distance between the outer surfaces at the lower portions of the sliders 62, thus, the sliders 62 can not escape from the cutout 73. The half circle 71 further includes a pair of through holes 72 as seen in FIG. 1.

The CPU mounting apparatus 10 further includes a pair of connecting blocks 56. The connecting blocks 56 are configured to be held by the lever holders 30 and to connect the pair of levers 51 together. Each connecting block 56 defines a through hole 58 corresponding to the holes 39 and a pivot hole 57 corresponding to the holes defined in fulcrum 54.

Figure 3:
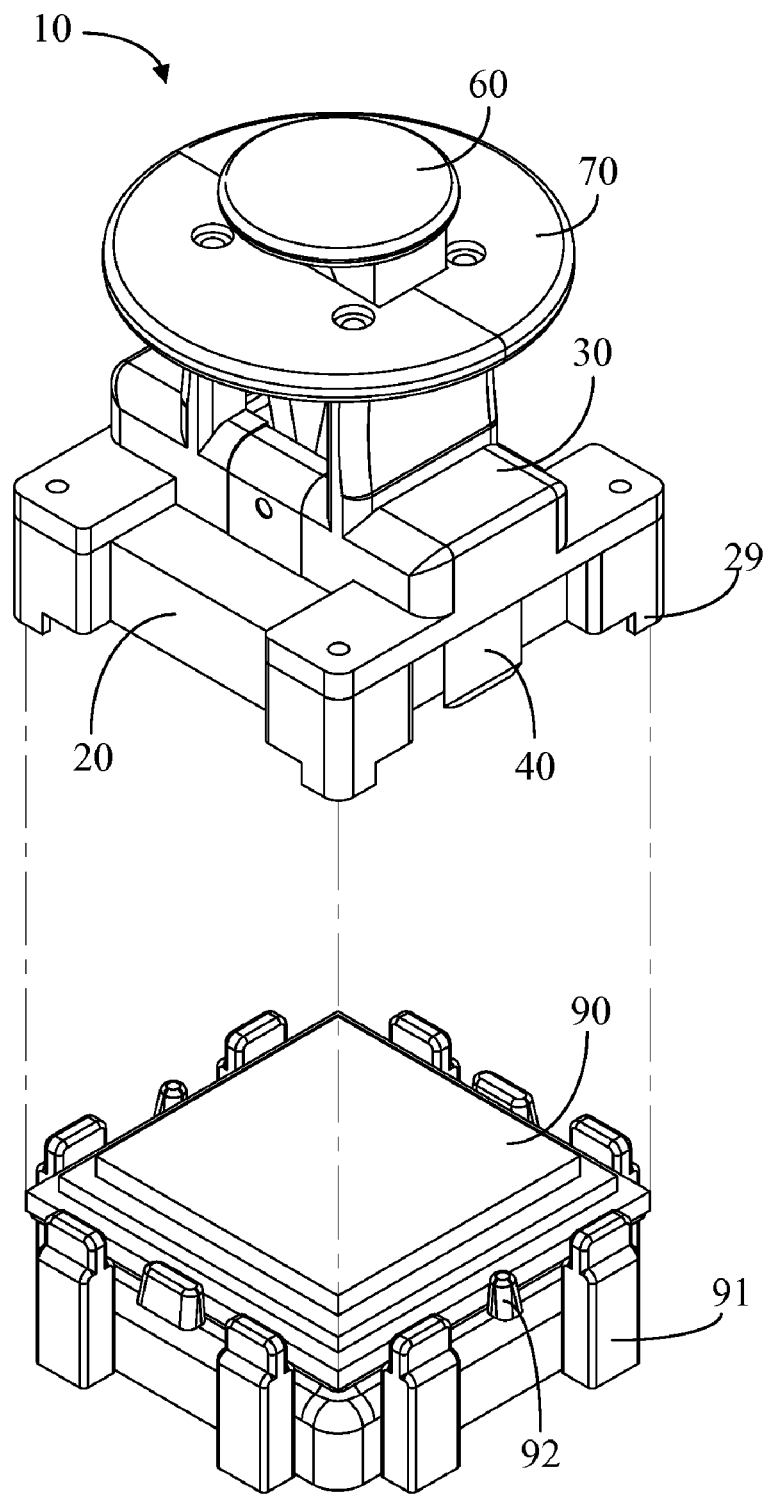
FIG. 3 is an assembled view of FIG. 1, together with a CPU on a tray.
Figure 4:
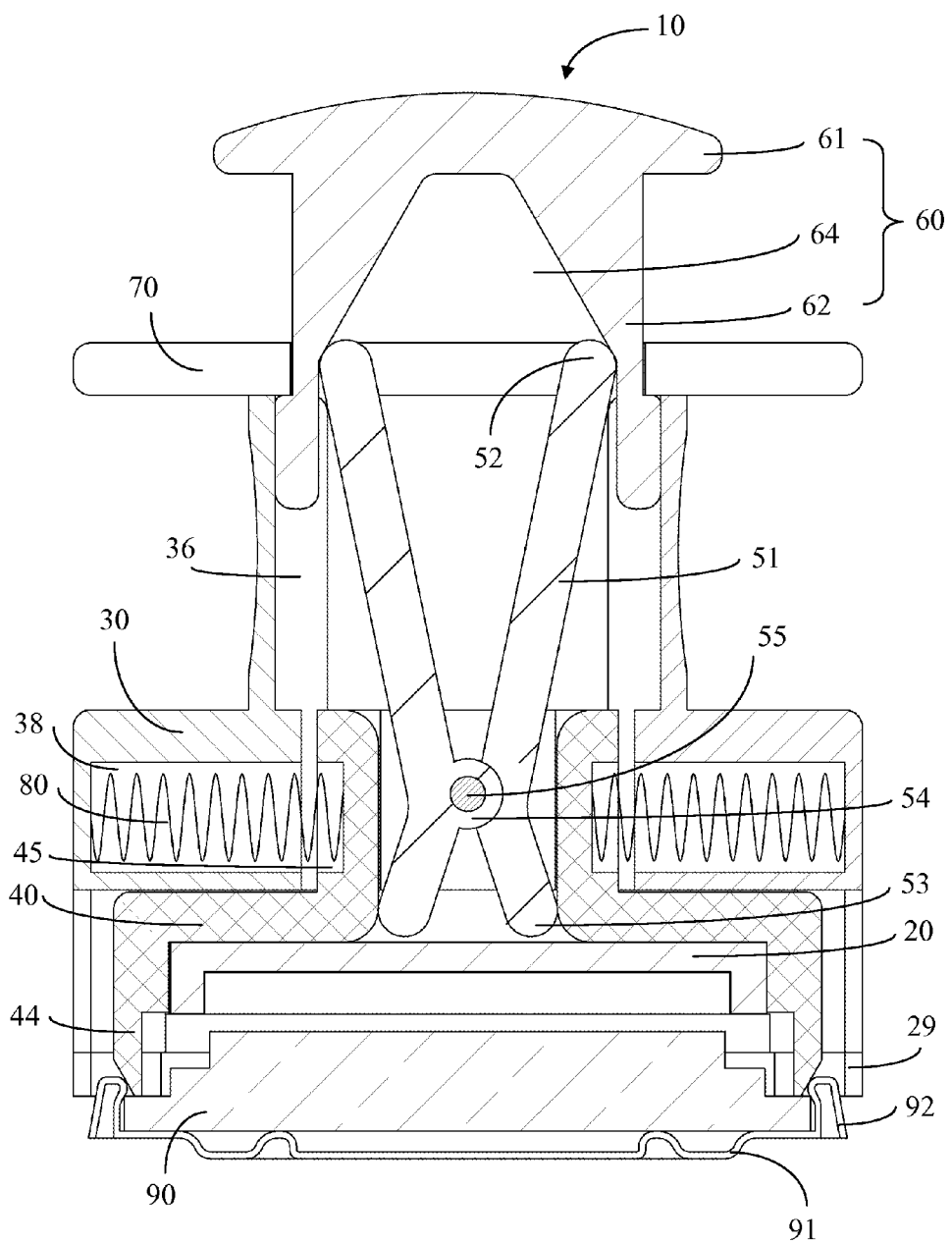
FIGS. 4-7 are cross-sectional views of an assembly of FIG. 3, showing the CPU is taken off from the tray.
Figure 5:
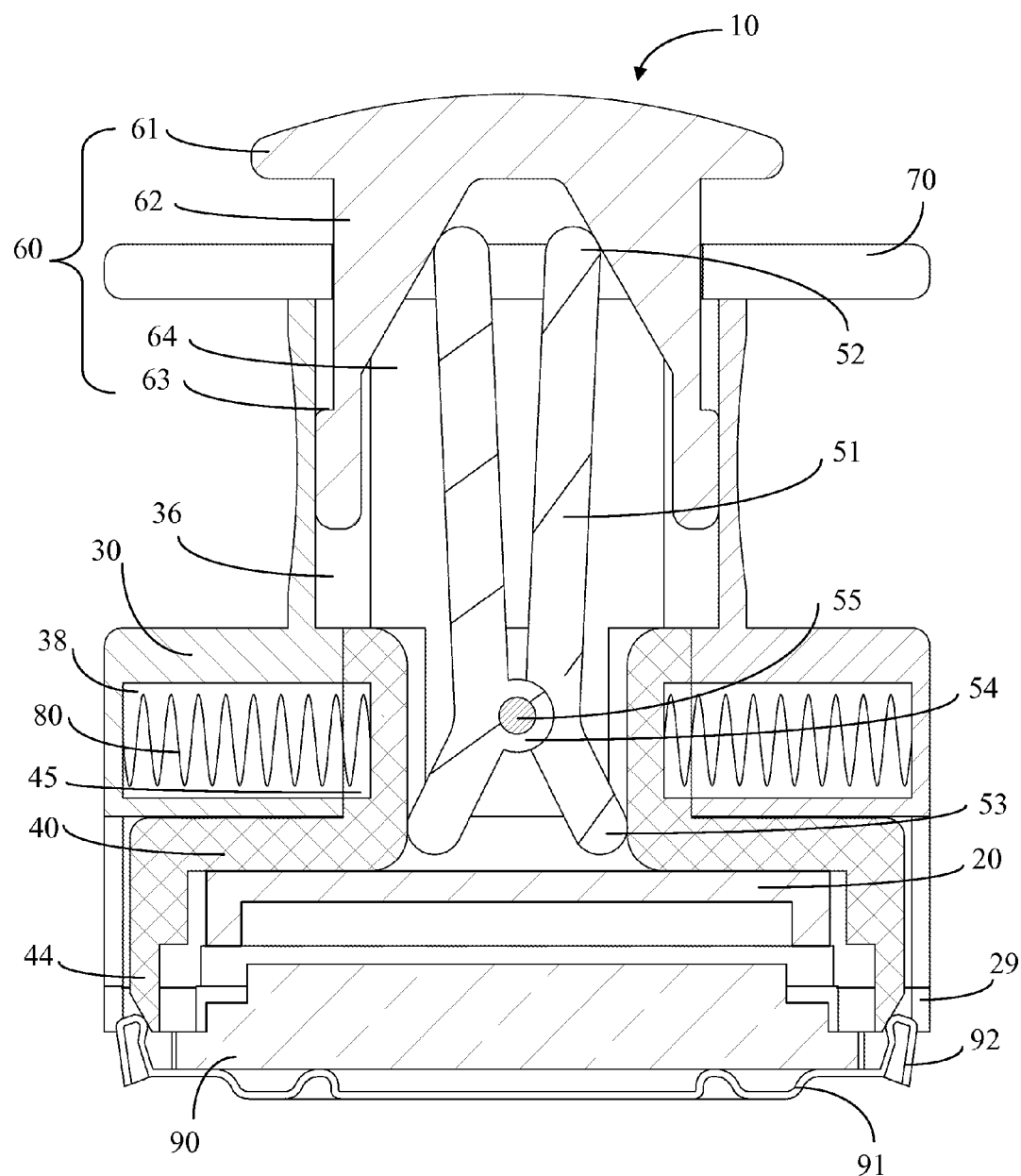
Figure 6:
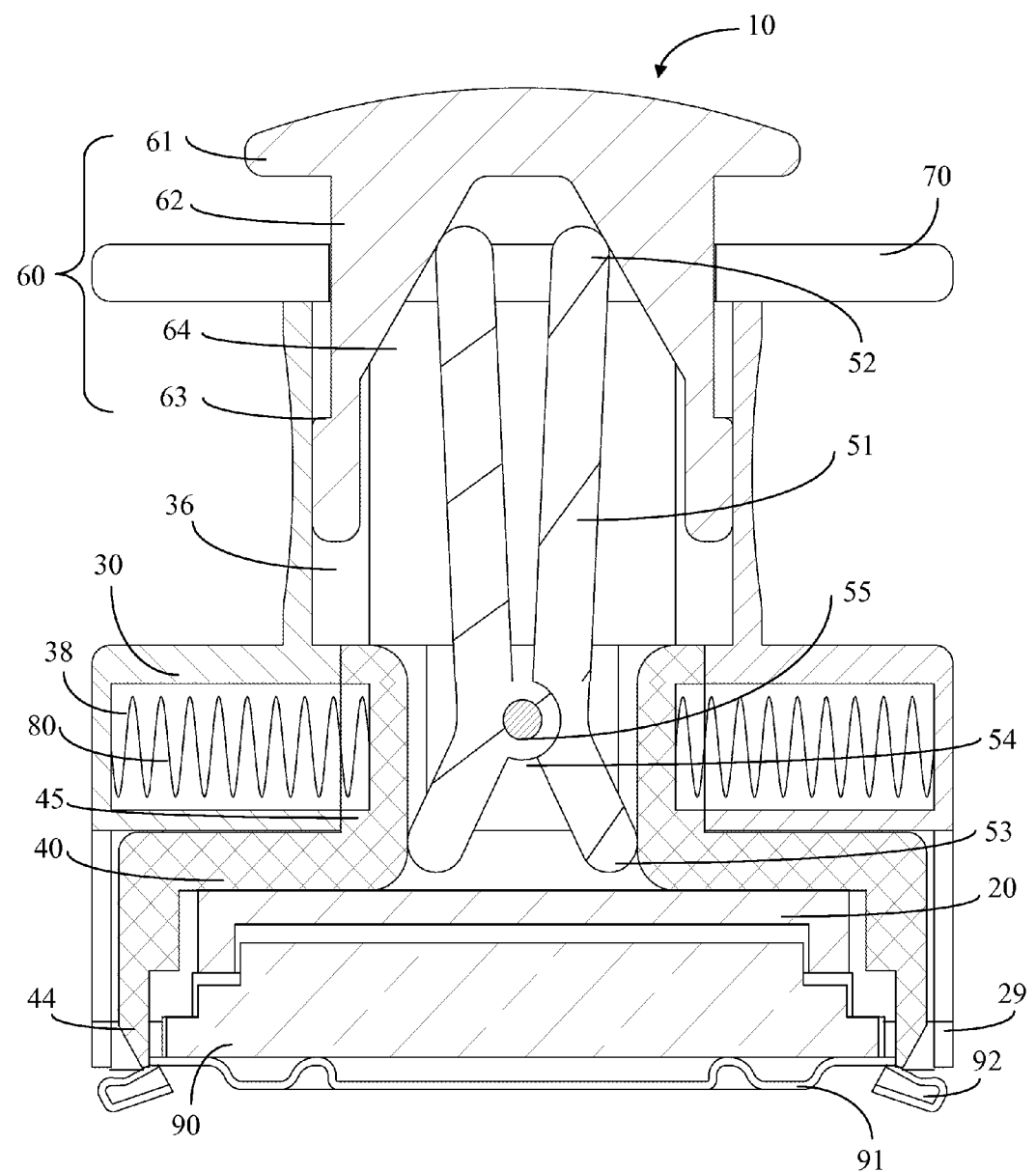
Figure 7:
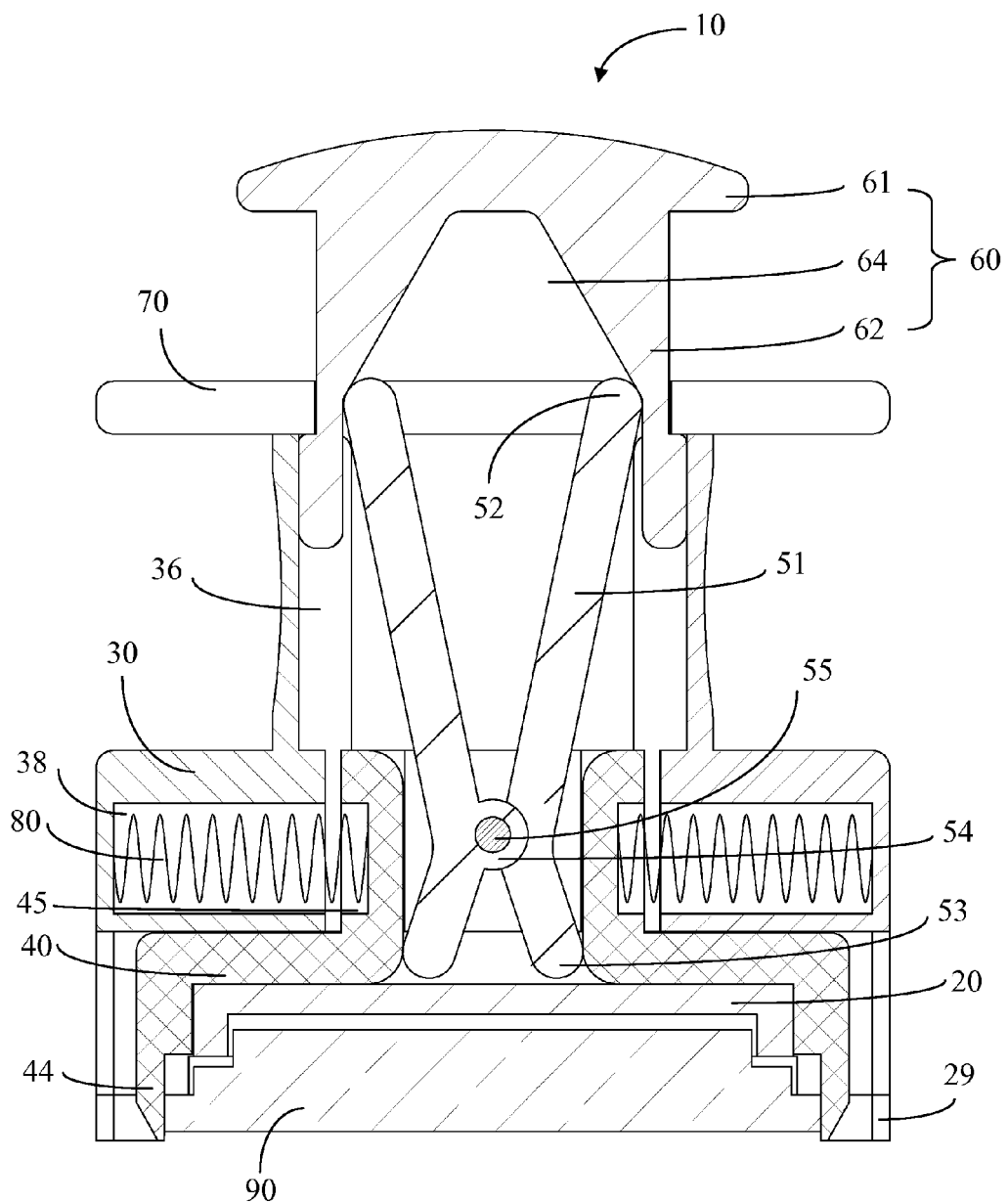
Figure 8:
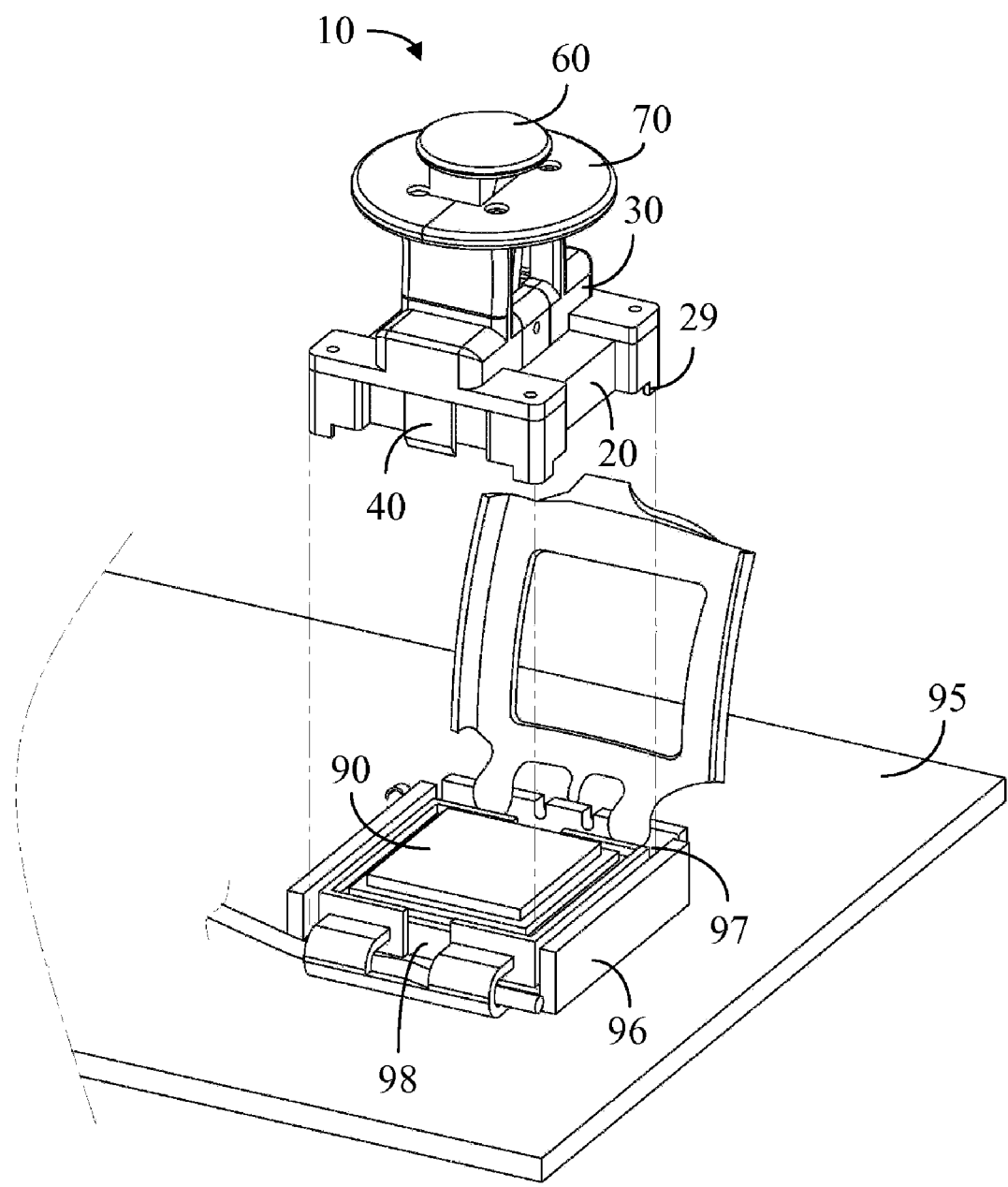
FIG. 8 is an assembled view of FIG. 1, together with the CPU and a socket on a motherboard.
Figure 9:
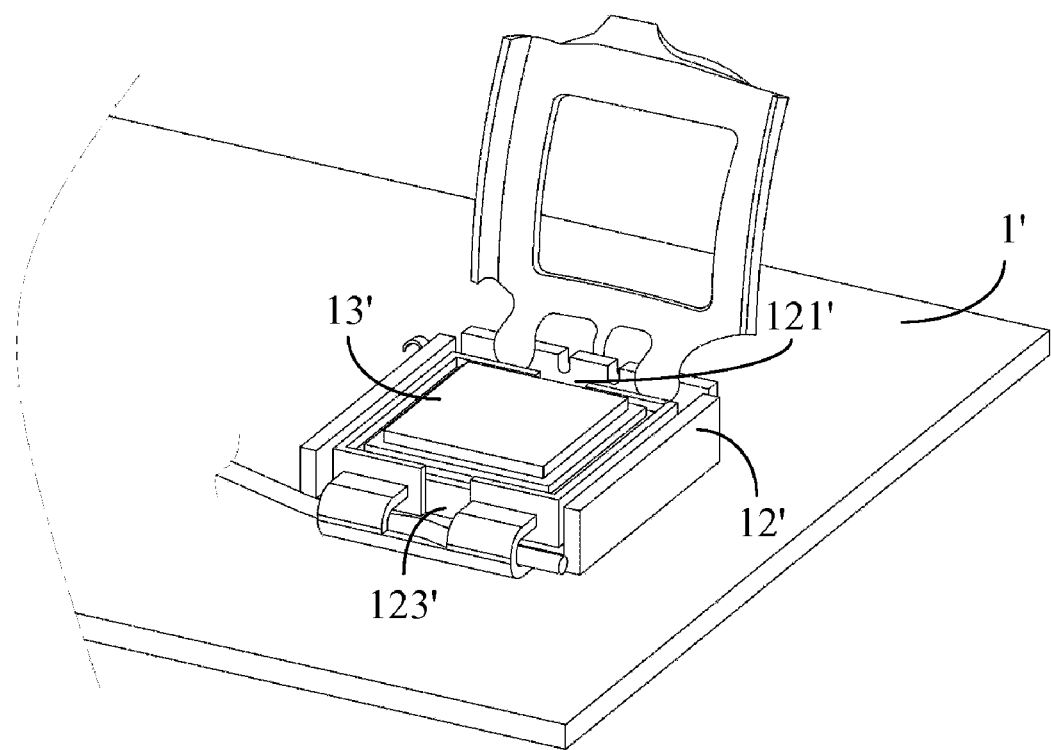
FIG. 9 is an illustration showing a conventional CPU installed in a socket on a motherboard.
Figure 10:
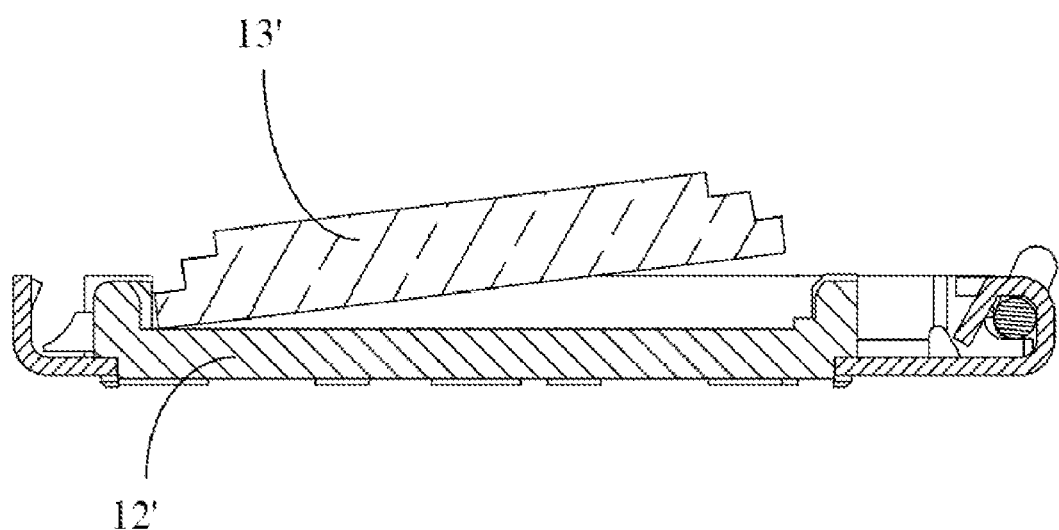
FIG. 10 is a cross-sectional view showing a conventional manual insertion of the CPU of FIG. 9 in the socket.

Referring to FIG. 3, in assembling the CPU mounting apparatus 10 the following steps are adhered to: Step 1, dispose the clips 40 on opposite ends of the clip guide groove 21 of the CPU receiver 20 correspondingly, horizontal portions of the clips 40 is received in the clip guide groove 21, and lower portions of the clips 40 is received in the cutouts 24.

Step 2, insert an end of one of the resilient members 80 into the resilient receiving hole 38 of one of the lever holders 30, place this lever holder 30 on the CPU receiver 20, let another end of this resilient member 80 be inserted into the resilient receiving hole 45 of one of the clips 40, align the holes 34 of the level holder 30 with the holes 22 of the CPU receiver 20, fix the lever holder 30 on the CPU receiver 20 by screwing screws (not marked) through the holes 22 and into the holes 34.

Step 3, place the connecting blocks 56 on the lever holders 30, insert a pair of connecting beam 59 through the through holes 58 of the connecting blocks 56 and into the holes 39 of the lever holder 30.

Step 4, repeat the step 2 with the other lever holder 30.

Step 5, combine the pair of lever 51 thereby yielding a lever assembly by aligning the fulcrum 54 of each lever 51 correspondingly and inserting the pivot rod 55 through the pivot holes of the fulcrum 54, and by holding the pivot rod 55 with the pair of connecting blocks 56 such that opposite ends of the pivot rod 55 is inserted into the pivot hole 57 of each connecting block 56 correspondingly. The second arms 53 of the lever assembly are inserted into the clip guide groove 21 of the CPU receiver 20.

Step 6, dispose the handle 60 on the lever assembly such that the sliders 62 are inserted into the sliding grooves 36 of the lever holders 30 and the lever actuating area 64 of the handle 60 receives the first arms 52 of the lever assembly. Fix each of the half circles 71 on the lever holders 30 and let the cutout 73 of the half circle 71 receives the sliders 62 partially, thus the hand holder 70 keeps the handle 60 from leaving the lever holders 30.

Also shown in FIG. 3 is a central processing unit (CPU) 90 received on a plastic tray 91. Two plastic clips 92 extend from two opposite sides of the tray 91 for clasping the CPU 90.

Referring to FIGS. 4-8, in assembling the CPU 90 to a socket 96 of a motherboard 95, first, the CPU mounting apparatus 10 is positioned above the tray 91. The clip ends 44 of the clips 40 contact the plastic clips 92 (See FIG. 4). Second, the handle 60 is pushed downwards, the sliders 62 apply forces on the first ends 52 of the levers 51, the second ends 53 of the levers 51 will then push the pair of clips 40 outwards, thus opening the plastic clips 92. The resilient members 80 compress correspondingly (See FIG. 5). Third, the CPU mounting apparatus 10 is moved downwards, the clip ends 44 of the clips 40 will then cut off the plastic clips 92 (See FIG. 6). Fourth, the handle 60 is relaxed, the resilient members 80 push the clips 40 to move inwards and firmly hold the CPU 90 (See FIG. 7). Last, the CPU mounting apparatus 10 holding the CPU 90 is placed on the socket 96 of the motherboard 95, the clip ends 44 are positioned in the gaps 98 of the socket 96 and the projection portions 29 of the base 20 are inserted into a groove 97 of the socket 96. The handle 60 is then pushed downwards to open up the clips 40. Then the CPU mounting apparatus 10 is removed and thus the CPU 90 is loaded in the socket 96 (See FIG. 8).

The CPU mounting apparatus 10 can also be used to remove the CPU 90 from the socket 96 in a similar process mentioned above.

It is to be understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A Central Processing Unit (CPU) mounting apparatus comprising:
   a CPU receiver defining a clip receiving groove in a top surface and a cavity for receiving a CPU in a bottom;
   two lever holders being facing each other and mounted on the CPU receiver above the clip receiving grooves;
   two clips slidably received in the clip receiving groove, each of the clips comprising a clip end for holding the CPU;
   two resilient members connecting the lever holders and the clips respectively;
   a pair of levers fixed on the lever holders, positioned between the clips for pushing the clips to move; and
   a handle mounted on the lever holders above the levers for driving the levers to move.

2. The CPU mounting apparatus of claim 1, wherein the base defines two cutouts on two opposite side surfaces for communicating with ends of the clip guide groove and the cavity.

3. The CPU mounting apparatus of claim 1, wherein the two lever holders define two sliding grooves faced to each other.

4. The CPU mounting apparatus of claim 3, wherein the handle comprises a pair of sliders received in the sliding grooves respectively.

5. The CPU mounting apparatus of claim 4, wherein the sliders define a lever actuating area therebetween for receiving first ends of the levers.

6. The CPU mounting apparatus of claim 5, wherein a horizontal distance between the sliders is configured to increase gradually from top ends to middle portions of the sliders.

7. The CPU mounting apparatus of claim 4, wherein the handle comprises a cap above the sliders.

\* \* \* \* \*